United States Patent [19]
Gochman et al.

[11] Patent Number: 5,842,008
[45] Date of Patent: Nov. 24, 1998

[54] METHOD AND APPARATUS FOR IMPLEMENTING A BRANCH TARGET BUFFER CACHE WITH MULTIPLE BTB BANKS

[75] Inventors: Simcha Gochman, Timrat; Nicolas Kacevas, Haifa, both of Israel

[73] Assignee: Intel Corporation, Santa Clara, Calif.

[21] Appl. No.: 665,516

[22] Filed: Jun. 18, 1996

[51] Int. Cl.[6] ........................................ G06F 9/38
[52] U.S. Cl. .................. 395/587; 395/382; 395/584; 395/586; 711/5
[58] Field of Search ................... 395/583, 584, 395/585, 586, 587, 382, 383; 711/5

[56]         References Cited

U.S. PATENT DOCUMENTS

| | | | |
|---|---|---|---|
| 4,943,908 | 7/1990 | Emma et al. | 395/587 |
| 5,434,985 | 7/1995 | Emma et al. | 395/587 |
| 5,530,825 | 6/1996 | Black et al. | 395/421.03 |
| 5,706,492 | 1/1998 | Hoyt et al. | 395/585 |

Primary Examiner—Kenneth S. Kim
Attorney, Agent, or Firm—Blakely, Sokoloff, Taylor & Zafman

[57] ABSTRACT

A Branch Target Buffer Circuit in a computer processor that predicts branch instructions within a stream of computer instructions is disclosed. The Branch Target Buffer Circuit uses a Branch Target Buffer Cache with multiple BTB banks that store branch information about previously executed branch instructions. The branch information stored in each bank of the Branch Target Buffer Cache is addressed by the last byte of each branch instruction When an Instruction Fetch Unit in the computer processor fetches a block of instructions it sends the Branch Target Buffer Circuit an instruction pointer. Based on the instruction pointer, the Branch Target Buffer Circuit looks in the Branch Target Buffer Cache banks to see if any of the instructions in the block being fetched is a branch instruction. When the Branch Target Buffer Circuit finds an upcoming branch instruction in the Branch Target Buffer Cache, the Branch Target Buffer Circuit informs an instruction Fetch Unit about the upcoming branch instruction.

14 Claims, 8 Drawing Sheets

FIG. 4b

METHOD AND APPARATUS FOR IMPLEMENTING A BRANCH TARGET BUFFER CACHE WITH MULTIPLE BTB BANKS

1. FIELD OF THE INVENTION

This invention relates to the field of microprocessor architecture. Specifically, the invention relates to a Banked Branch Target Buffer Circuit that predicts the existence of branch instructions within an instruction stream and the outcome of those branch instructions.

2. ART BACKGROUND

Early microprocessors generally processed instructions one at a time. Each instruction was processed using four sequential stages: instruction fetch, instruction decode, execute, and result writeback. Within such microprocessors, different dedicated logic blocks performed each different processing stage. Each logic block waited until all the previous logic blocks complete operations before beginning its operation.

To improve efficiency, microprocessor designers overlapped the operations of the fetch, decode, execute, and writeback logic stages such that the microprocessor operated on several instructions simultaneously. In operation, the fetch, decode, execute, and writeback logic stages concurrently process different instructions. At each clock tick the result of each processing stage is passed to the following processing stage. Microprocessors that use the technique of overlapping the fetch, decode, execute, and writeback stages are known as "pipelined" microprocessors. Some microprocessors further divide each processing stage into substages for additional performance improvement. Such processors are referred to as "deeply pipelined" microprocessors.

In order for a pipelined microprocessor to operate efficiently, an instruction fetch unit at the head of the pipeline must continually provide the pipeline with a stream of microprocessor instructions. However, conditional branch instructions within an instruction stream prevent the instruction fetch unit from fetching subsequent instructions until the branch condition is fully resolved. In pipelined microprocessor, the branch condition will not be fully resolved until the branch instruction reaches an instruction execution stage near the end of the microprocessor pipeline. Accordingly, the instruction fetch unit will stall because the unresolved branch condition prevents the instruction fetch unit from determining which instructions to fetch next.

To alleviate this problem, many pipelined microprocessors use branch prediction mechanisms that predict the existence of branch instructions within an instruction stream and the outcome of those branch instructions. The instruction fetch unit uses the branch predictions to fetch subsequent instructions. For example, Yeh & Patt introduced a highly accurate two-level adaptive branch prediction mechanism. (See Tse Yu Yeh and Yale N. Patt, *Two-Level Adaptive Branch Prediction*,The 24th ACM/IEEE International Symposium and Workshop on Microarchitecture, November 1991, pp. 51–61) The Yeh & Patt branch prediction mechanism makes branch predictions based upon two levels of collected branch history.

To predict branch instructions within the instruction stream, most Branch prediction mechanisms maintain a cache that contains information about branch instructions that the microprocessor has previously executed. The cache containing the branch information is referred to as the Branch Target Buffer. Each time a branch instruction is resolved by the microprocessor, the Branch prediction mechanism records information about the branch, such as the type of branch instruction, the branch instruction's target address, and the outcome of the branch instruction into the Branch Target Buffer for future reference.

Instruction fetch units employ a branch prediction mechanism by giving the branch prediction mechanism a current instruction pointer and requesting the branch prediction mechanism to provide information about any upcoming branch instructions. Many instruction fetch units fetch upcoming instructions by fetching a several bytes at the same time. For example, an instruction fetch unit may fetch instructions by fetching sixteen byte blocks of memory. In such a system, the branch prediction mechanism must find the first taken branch instruction (if any) within the current sixteen byte block to determine the next 16 byte block to fetch. If no branch instruction is predicted, then the next sequential 16 byte block is fetched.

Branch prediction mechanisms reside at the very beginning of an instruction pipeline. The branch prediction mechanism must be able to very quickly search through the branch target buffer to determine if there is an upcoming branch instruction that will redirect the instruction fetching to a nonsequential address. In a branch target buffer that returns more than one possible "hit", the branch prediction circuit must sort through the possible hits to locate a first taken branch instruction. It is therefore desirable to design branch target buffers such that they can be quickly searched for any upcoming branch instruction.

SUMMARY OF THE INVENTION

To quickly fetch upcoming program instructions, many processors implement branch prediction mechanisms. Many processors fetch upcoming program instructions by fetching blocks of memory containing upcoming instructions. Branch prediction mechanisms in such systems predict the next block of memory to fetch based up a current instruction pointer. To efficiently make such predictions, a banked branch target buffer is introduced. The banked branch target buffer consists of several different branch target buffer banks. Each branch target buffer bank contains branch entries for branch instructions located in a different subset of the memory blocks. The branch target buffer banks are ordered such that when a branch prediction must be made, the branch entry "hits" produced by each branch target buffer bank are ordered. A prioritizer circuit selects the first taken branch from the ordered branch entry "hits".

BRIEF DESCRIPTION OF THE DRAWINGS

The objects, features and advantages of the present invention will be apparent to one skilled in the art, in view of the following detailed description and drawings in which:

FIG. 3b is a block diagram of the branch entries of the prior art branch target buffer circuit of FIG. 3a.

FIG. 4b is a block diagram of the four 4-way set-associative branch target buffer banks.

DETAILED DESCRIPTION OF THE INVENTION

Methods and apparatus for implementing a Banked Branch Target Buffer Circuit in a computer processor are disclosed. In the following description, for purposes of explanation, specific nomenclature is set forth to provide a thorough understanding of the present invention. However, it will be apparent to one skilled in the art that these specific details are not required in order to practice the present invention. Furthermore, well known circuits and devices are shown in block diagram form in order not to obscure the present invention.

A Pipelined Microprocessor

In a deeply pipelined processor, the major stages of a pipelined processor such as instruction fetch, instruction decode, and instruction execute, are divided into several different substages such that each processing stage is pipelined. This results in a long instruction pipeline. For example, FIG. 1 illustrates a set of pipeline stages that defines one particular deeply pipelined processor.

Figure 1:
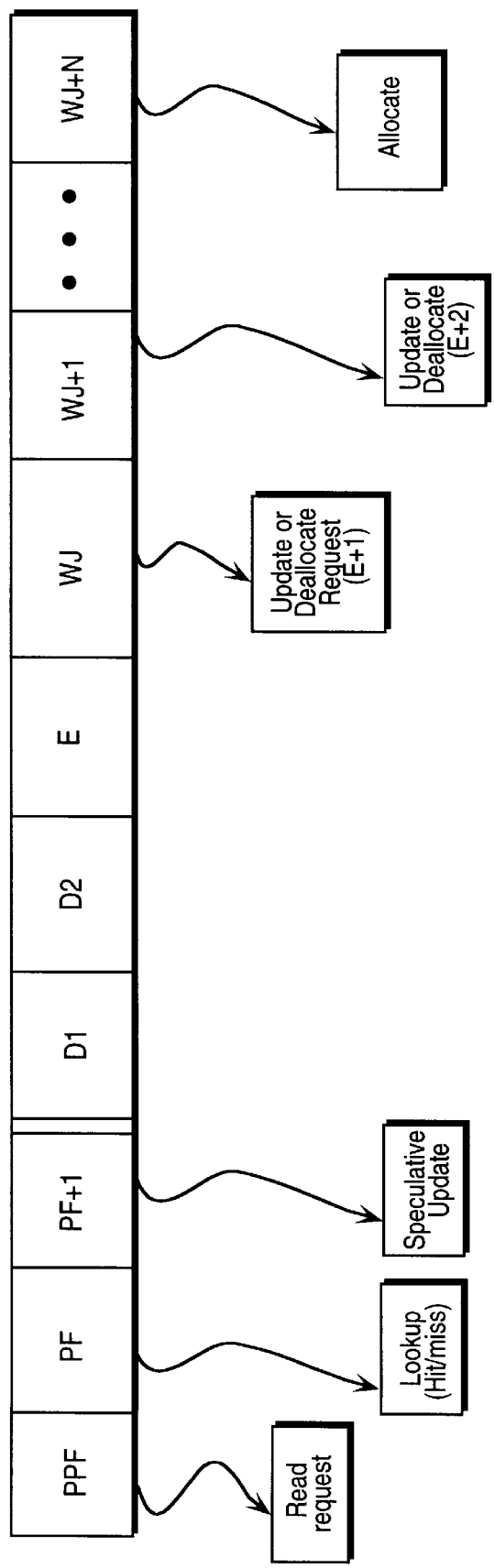
FIG. 1 is a block diagram of a deep microprocessor pipeline for processing microprocessor instructions.

To operate the microprocessor efficiently, the early instruction fetch pipeline stages in FIG. 1 must continually fetch a stream of microprocessor instructions. Each fetched instruction is not fully executed until it reaches the execution stage. Branch instructions within the instruction stream often direct the microprocessor to begin executing instructions at a nonsequential address referred to as the branch target address. When a pipelined microprocessor encounters a branch instruction, the instruction fetch stages can not immediately react to the branch instruction since the branch instruction has not yet been decoded or executed. Thus, branch instructions can cause a deeply pipelined microprocessor to speculatively execute down the wrong path such that the microprocessor must later flush the speculatively executed instructions and restart at a corrected address.

To prevent such situations, many pipelined microprocessors employ a branch prediction mechanism that predicts the existence of branch instructions within the instruction stream. Furthermore, such branch prediction mechanisms also predict the branch target address and the branch outcome of conditional branch instructions.

To predict branch instructions in a microprocessor containing a deep pipeline such as the pipeline illustrated in FIG. 1, the present invention comprises a Banked Branch Target Buffer Circuit that predicts the existence of branch instructions within the instruction stream. The Branch Target Buffer Circuit of present invention is disclosed within the context of a deeply pipelined superscalar microprocessor. However, it will be apparent to those skilled in the art that individual features of the disclosed Branch Target Buffer Circuit can be implemented in other microprocessors within different architectures.

Memory Block Fetching

As described in the preceding section, the pipeline fetch stages are responsible for fetching instructions into the microprocessor. To reduce the number of times that the fetch stages need to access main memory (or a cache memory), the instruction fetch stages can be designed to fetch blocks of memory instead of single instructions.

Figure 2:
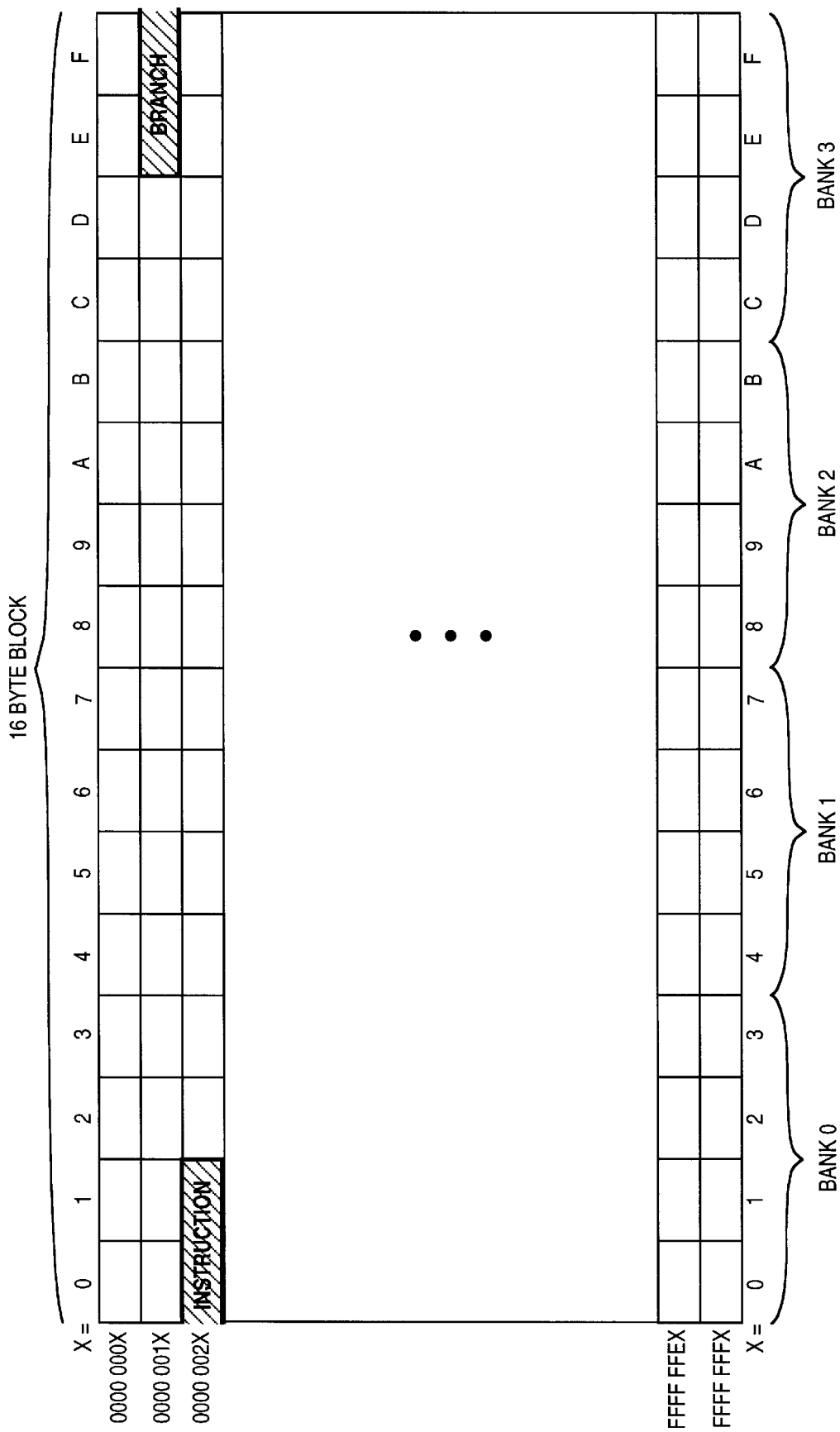
FIG. 2 is a diagram of a memory map where the address space has been divided into 16 byte memory blocks.

In the disclosed embodiment of the present invention, the fetch stages view the memory address space as a collection of aligned 16 byte memory blocks such that the fetch stages fetch instructions and operands from memory in 16 byte blocks. FIG. 2 illustrates memory map where the address space is split into aligned 16 byte blocks.

To know the exact point where instruction execution is taking place, the fetch stages maintain an instruction pointer. To fetch a memory block, the 4 least significant bits of the instruction pointer are ignored. In the normal course of operations, the fetch stages fetch sequential 16 byte memory blocks to obtain upcoming instructions and operands. However, to compensate for branch instructions, the fetch stages use branch prediction information from a branch prediction circuit. Most branch prediction circuits contain a branch target buffer cache that stores information about previously executed branch instructions. If the branch prediction circuit finds an upcoming branch in the branch target buffer cache, then a branch prediction will be made.

A Prior Art Branch Target Buffer Cache

Figure 3A:
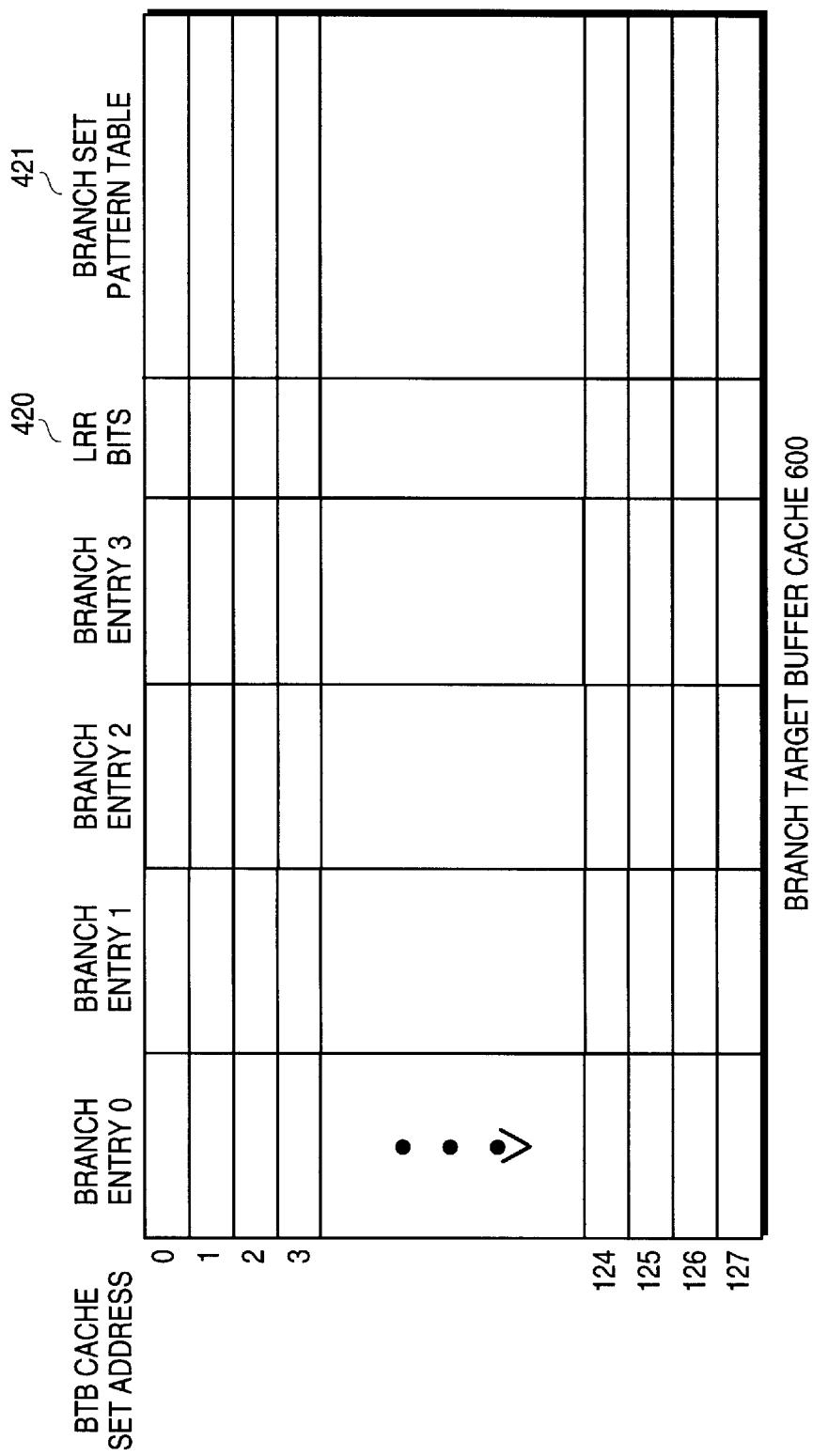
FIG. 3a is a block diagram of a prior art branch target buffer circuit.
Figure 3B:
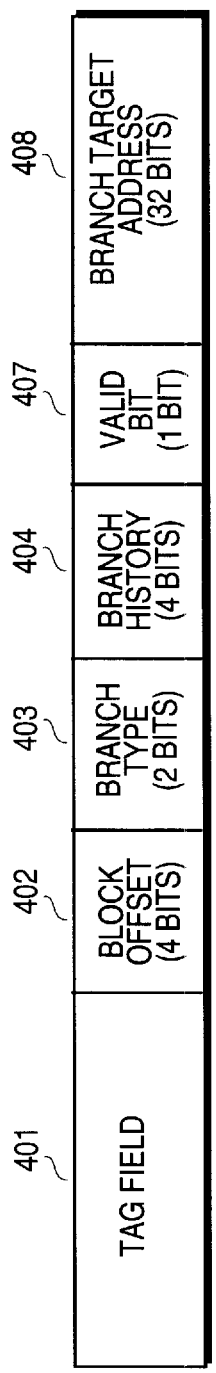

To illustrate advantages of the present invention over the prior art, an earlier branch target buffer cache implementation is illustrated. FIGS. 3a and 3b illustrate the organization of a prior implementation of a Branch Target Buffer Cache 600.

The Branch Target Buffer Cache 600 of FIG. 3a is set-associative cache that stores information about branch instructions in 128 individual "lines" of branch information. Each line of branch information in the Branch Target Buffer Cache 600 contains 4 branch entries wherein each branch entry contains information about a single branch instruction that the microprocessor has previously executed (if the valid bit is set in the entry).

Each line of four branch entries within the Branch Target Buffer Cache 600 may also include a branch pattern table 421 and a pair of PseudoLeast Recently Replaced (PLRR) bits 420. The branch prediction circuit uses the branch pattern table 421 for predicting the outcome of conditional branch instructions in the line of branch entries. The branch prediction circuit uses the Pseudo-Least Recently Replaced (PLRR) bits 420 to select a branch entry in the line when information about a new branch will be written into the line of branch entries.

FIG. 3b illustrates the branch information stored within each branch entry of the Branch Target Buffer Cache 600 lines. As illustrated in FIG. 3b, each branch entry contains a tag address field 401, a block offset field 402, a branch type field 403, a branch history field 404, a valid bit 407, and a branch target address field 408.

The branch type field 403 in each branch entry specifies what type of branch instruction the branch entry identifies. The branch history field 404 in FIG. 3b maintains the taken or not-taken history of the branch instruction as determined by an Execution Unit. The valid bit 407 indicates whether the branch entry contains valid branch information. When the branch prediction circuit allocates and fills a branch entry, the branch prediction circuit sets the valid bit 407 for the entry thereby indicating that the entry contains valid branch information. Later, when the branch entry is deallocated, the valid bit 407 for the deallocated entry is cleared. The branch target address field 408 in FIG. 3b stores the branch target address for the branch instruction.

The tag address 401 and the block offset 402 are used to identify a memory address of the branch instruction associated with the branch entry. The tag address 401 and the cache line are combined to create the address of the 16 byte memory block that contains the last byte of the branch instruction. The block offset value 402 is a four bit value that indicates the exact byte offset within the 16 byte memory block address of the branch instruction's last byte. Branch instructions are indexed by the last byte such that every byte of a branch instruction that crosses a block boundary will be fetched before making a branch prediction. For example, referring again to the memory map of FIG. 2, a four byte long branch instruction is illustrated at the hexadecimal address 1E to 21. After being executed, the four byte branch instruction will be placed into an entry of the Branch Target Buffer Cache and associated with the hexadecimal address 21. Thus the block offset 402 in the branch entry for that branch instruction will be set to 1.

Since each branch line contains four branch entries and each branch entry can have the same value in the tag address field 401, there can be up to four hits each time a search of the branch target buffer cache 600 is performed. To select the relevant hit, the branch prediction circuit must select the first taken branch that is located after the instruction pointer. This is a time consuming difficult task that cannot be performed in one clock cycle.

A Banked Branch Target Buffer Circuit

Figure 4A:
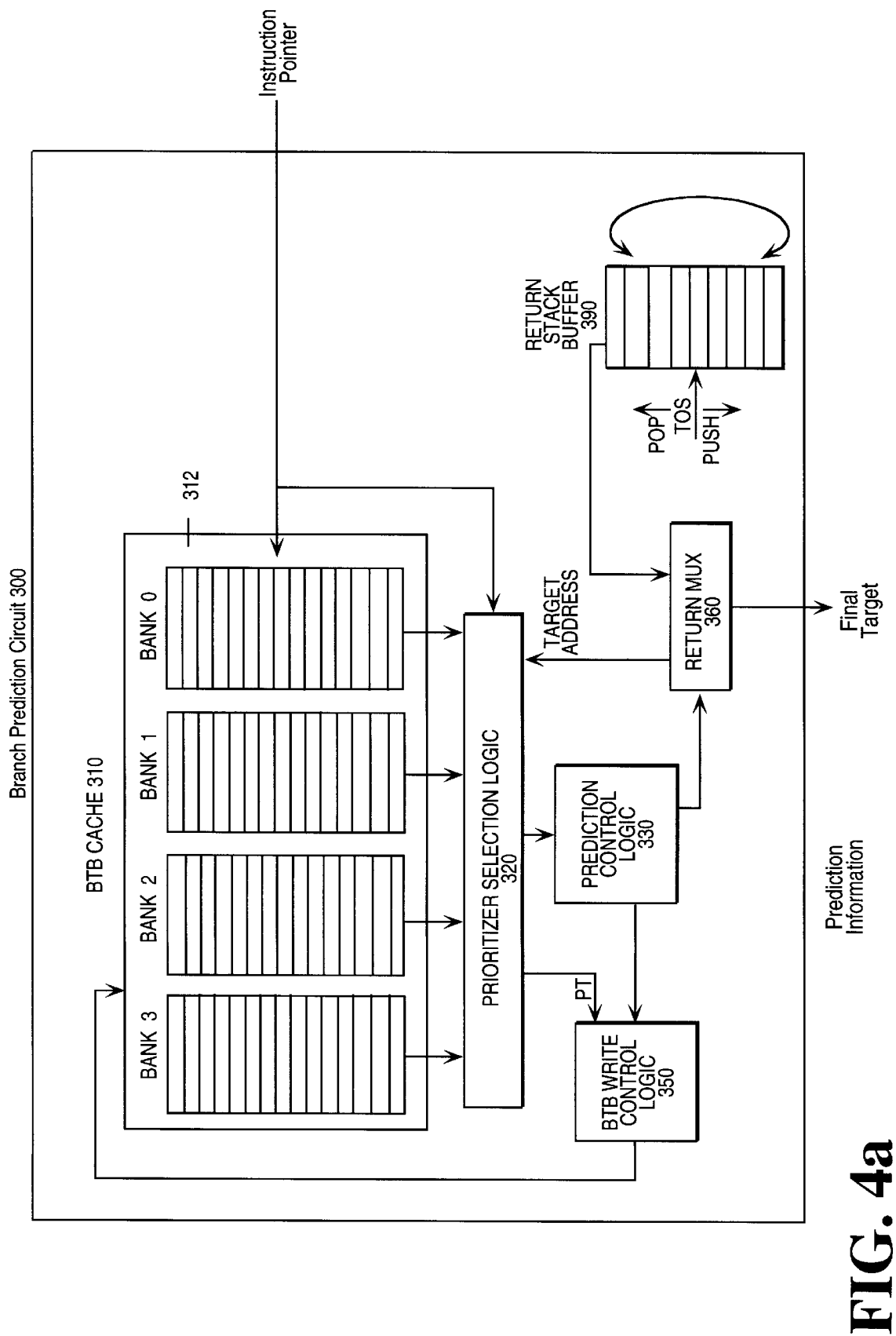
FIG. 4a is a block diagram of a branch prediction circuit that uses a banked branch target buffer.

FIG. 4a illustrates one embodiment of a branch prediction circuit with a banked branch target buffer. The branch prediction circuit 300 has a Branch Target Buffer Cache 310 that contains information about branch instructions that the same microprocessor has previously executed. The branch prediction circuit 300 uses the information in the Branch Target Buffer Cache 310 to recognize previously executed branch instructions and predict the branch instruction outcome. The Branch Target Buffer Cache 310 is divided into four separate "banks." Each bank contains information about branch instructions from a particular subset of bytes within the memory blocks.

The branch prediction circuit 300 makes a branch prediction for any branch instructions located in the memory block currently being fetched by the instruction fetch unit found in the Banked Branch Target Buffer Cache 310. The branch prediction circuit 300 makes a branch prediction by searching the Banked Branch Target Buffer Cache 310 using an instruction pointer provided by an instruction fetch unit. The branch prediction circuit 300 passes the branch prediction information to the instruction fetch unit thereby informing the instruction fetch unit which memory block to fetch next.

The branch prediction circuit 300 also maintains a Return Stack Buffer 390 that contains information about Return From Subroutine instructions. Most branch instructions always branch to the same target location. Correspondingly, the Branch Target Buffer Cache 310 maintains a branch target address for each known branch instruction. However, Return From Subroutine instructions branch to a return address that was pushed onto an architectural stack before a jump was made to a subroutine. Thus, Return From Subroutine branch instructions branch to different target addresses. To predict the return addresses for Return From Subroutine branch instructions, the Branch Target Buffer Circuit 310 uses the Return Stack Buffer 390. After each Call Subroutine instruction is executed, a return address is pushed onto the Return Stack Buffer 390. When a corresponding Return From Subroutine instruction is encountered, a return address is popped off the Return Stack Buffer 390 and used as a branch target address.

The Banked Branch Target Buffer Cache

Figure 4B:
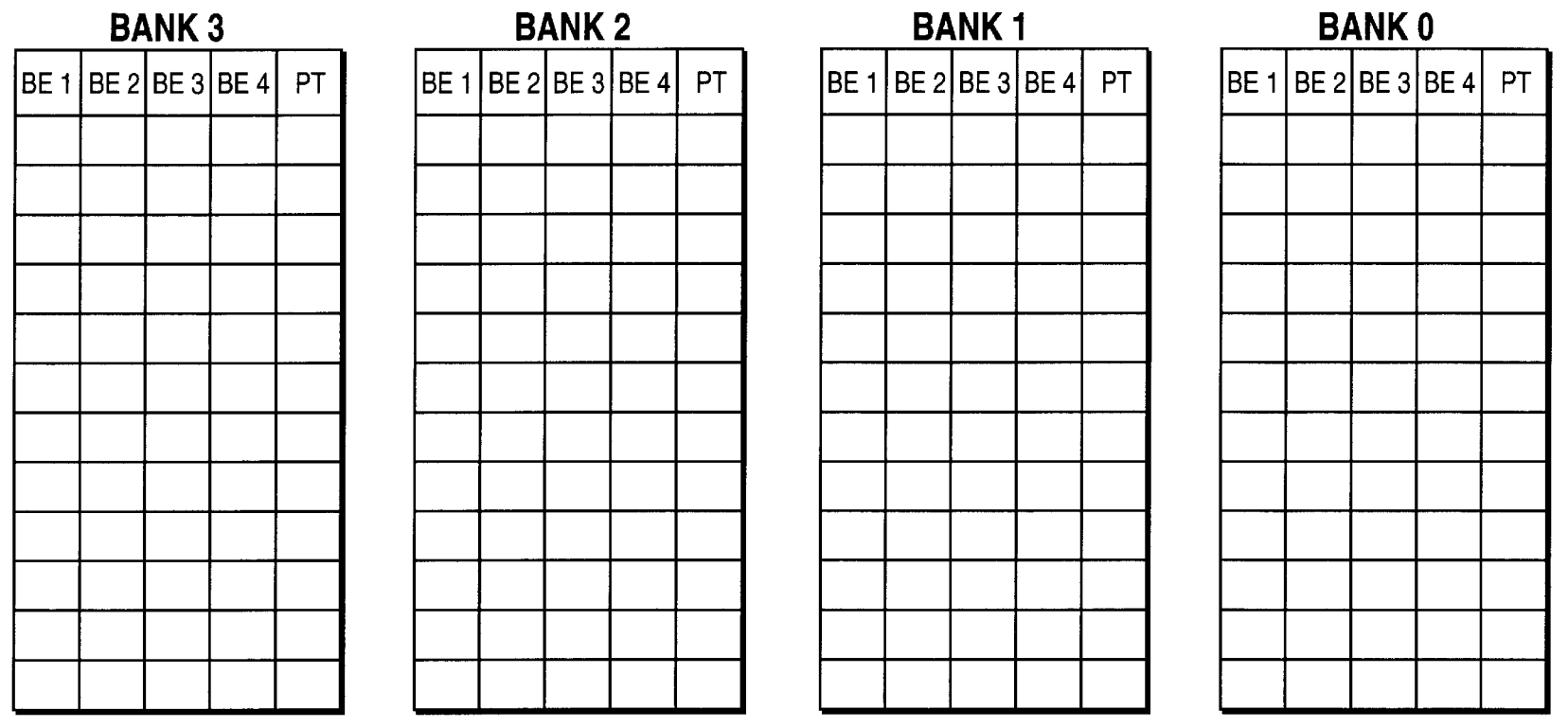
Figure 4C:
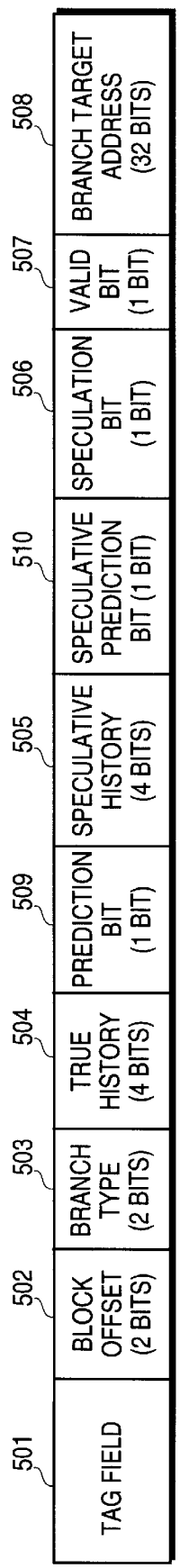
FIG. 4c is a block diagram of the individual branch entries from each of the branch target buffer banks of FIG. 4b.

FIGS. 4a, 4b and 4c illustrate the organization of the Banked Branch Target Buffer Cache 310. The Banked Branch Target Buffer Cache 310 is cache that stores information about branch instructions located in main memory. In the present embodiment, the Branch Target Buffer Cache 310 stores information about branch instructions in four separate branch target buffer "banks": Bank 0 to Bank 3, as illustrated in FIG. 4a.

Each branch target buffer bank contains 16 lines as illustrated in FIG. 4b. Each line of each branch target buffer bank comprises of 4 branch entries (BE1 to BE4) organized into a set. Each branch entry contains information about one branch instruction that has been previously encountered. Each line of each branch target buffer bank all has a branch pattern table (PT) that is shared by the four branch entries of that branch target buffer bank line.

Each branch target buffer bank (Bank 0 to Bank 3) contains information about branch instructions from a particular subset of bytes within memory blocks. Specifically, in the current embodiment, Bank 0 contains branches that end in the first four bytes of each memory block, Bank 1 contains branches that end in the next four bytes of each memory block, Bank 2 contains branches that end in the next four bytes of each memory block, and Bank 3 contains branches that end in the last four bytes of each memory block. This concept is illustrated in the memory map of FIG. 2.

Referring back to FIG. 4b, each line contains four branch entries (BE1 to BE4) and all four entries share the same branch pattern table (PT) from the line. In the present embodiment, none of the branch entries from the same branch target buffer line can be from the same actual memory block. By ensuring that none of the entries from the same line come from the same memory block, then there will only be one possible hit from each branch target buffer bank.

FIG. 4c illustrates the branch information stored within each branch entry of each branch target buffer bank. As illustrated in FIG. 4c, each branch entry contains a tag address field 501, a block offset 502, a branch type field 503, a true branch history field 504, a prediction bit 509, a speculative branch history field 505, a speculative prediction bit 510, a speculation bit 506, a valid bit 507, and a branch target address field 508.

Like the prior art branch target buffer, the tag address 501 and the block offset 502 are used to identify a memory address of the branch instruction associated with the branch entry. The tag address 501 and the branch target buffer cache line are combined to create the address of the 16 byte memory block that contains the last byte of the branch instruction. However, in the banked branch target buffer the block offset 502 is different.

Specifically, the block offset 502 of the Banked Branch Target Buffer Cache 310 is only 2 bits instead of four bits. The reason for this is that the Banked Branch Target Buffer Cache 310 has already divided the branch instructions into different subsets of each memory block by using Bank 0 for branches that end in the first four bytes of each memory block and so on until Bank 3 is for branches that end in the last four bytes of each memory block. Thus, the block offset 502 specifies which of the four bytes in a memory block contains the last byte of the branch instruction.

It will be apparent to those skilled in the art that with the banked branch target buffer cache structure, the branch entries in each "line" from the branch target buffer cache are pre-sorted. Thus, it is much easier for the prioritizer selection logic 320 to locate the first taken branch instruction located after the instruction pointer. In the embodiment of the present invention, the pre-sorted branch entries of the banked branch target buffer cache allow a relevant branch target buffer hit to be located in a single clock cycle.

The branch type field 503 in each branch entry specifies what type of branch instruction the branch entry identifies. The following Table 1 lists the different types of branch instructions.

TABLE 1

| Branch Type Code | Branch Type |
| --- | --- |
| 00 | Conditional branch |
| 01 | Return From Subroutine |
| 10 | Call Subroutine |
| 11 | Unconditional branch |

The branch prediction circuit 300 uses the branch type field 503 when making a branch prediction since different branch prediction mechanism is used for different type of branch instruction. For example, the branch prediction circuit 300 predicts the outcome of conditional branch instruction based upon the branch instruction's history, but the branch prediction circuit 300 always predicts an unconditional branch instruction as taken.

The true branch history field 504 in FIG. 4c maintains the fully-resolved taken or not-taken history of the branch instruction as determined by an Execution Unit. The true branch history field 504 stores branch history for the last 4 executions of the branch instruction using 4 bits where "0" designates not-taken and "1" designates taken. The 4 bits of taken or not-taken history are used to index into a pattern state table when calculating a branch prediction. The prediction bit 509 stores a precalculated branch prediction based upon the true branch history field 504 and the pattern table. The prediction is made during an update to the true branch history field 504 since this speeds the branch prediction process at the front end of the processor.

The speculation bit 506 and the speculative branch history field 505 are used to help make predictions for branch instructions without waiting for branch instructions to execute. The speculative branch history field 505 in FIG. 4c maintains the "speculative" taken or not-taken history of the branch instruction for the last 4 branch predictions made by the Branch Target Buffer Circuit 300. The speculation bit 506 is set when the speculative branch history field 505 contains valid speculative history. The 4 bits of speculative branch history 505 are used to index into the pattern state table when calculating a branch prediction for the speculative prediction bit field 510. The prediction in the speculative prediction bit field 510 is used when the speculation bit 506 is set. For more information on predicting branch instructions using the speculative branch history, see the copending patent application "Speculative History Mechanism in a Branch Target Buffer", Ser. No. 08/062,012, filed May 14, 1993.

The valid bit 507 indicates whether the branch entry contains valid branch information. When the Branch Target Buffer Circuit 300 allocates and fills a branch entry, the Branch Target Buffer Circuit 300 sets the valid bit 507 for the entry thereby indicating that the entry contains valid branch information. Later, when a branch entry is deallocated, the valid bit 507 for the deallocated entry is cleared.

The branch target address field 508 in FIG. 4c stores the branch target address for the branch instruction except if the branch instruction is a Return From Subroutine instruction. If the branch prediction circuit 300 predicts the branch instruction associated with the branch entry is taken, the address in the branch target address field 508 can be passed to the Instruction Fetch Unit to inform the Instruction Fetch Unit where the next instructions should be fetched from. (However, the branch target address field 508 is not always used to predict the target address since a target address from the return stack buffer may be used instead.) The upper 28 bits of the branch target address field 508 select a 16 byte memory block that the Instruction Fetch Unit should fetch if the branch is taken. The lowest 4 bits of the branch target address field 508 select the byte in the fetched block where the microprocessor should resume execution.

Predicting Branch Instructions using the Banked Branch Target Buffer Cache

Figure 5:
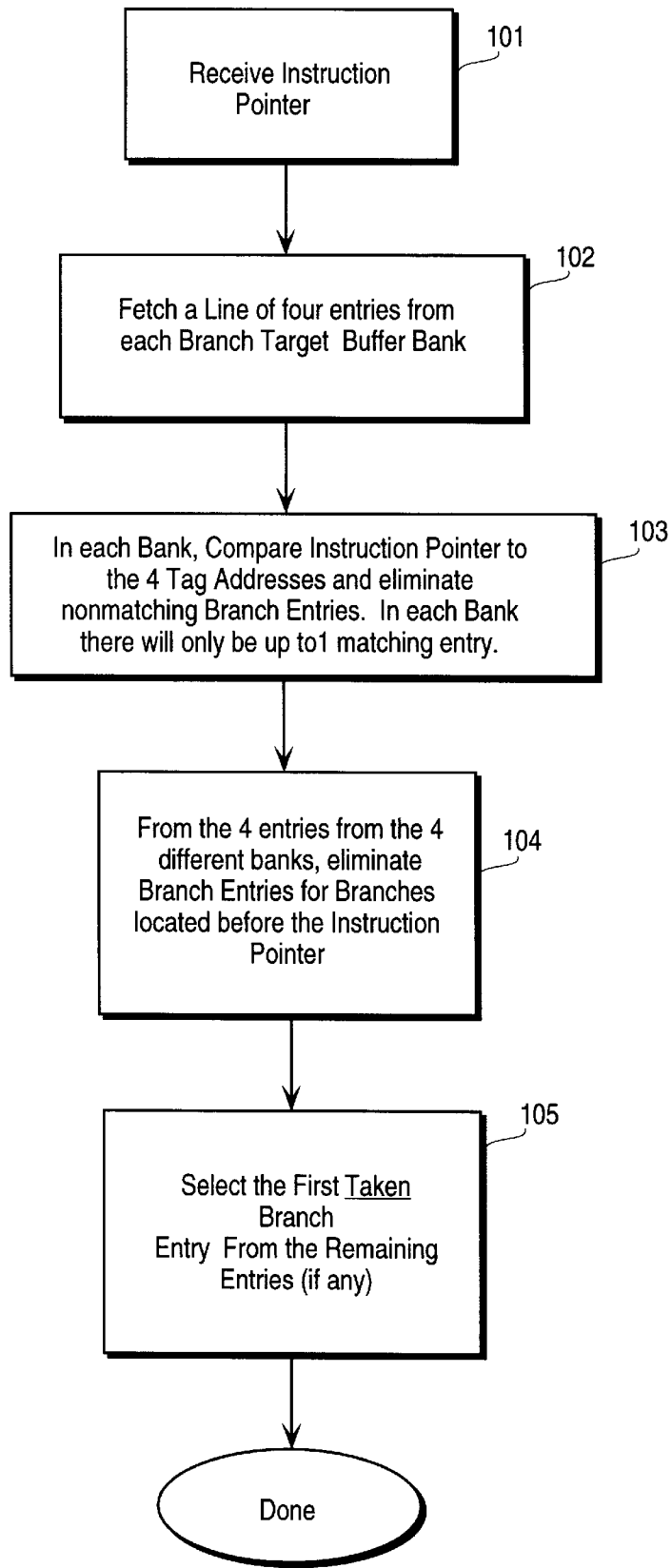
FIG. 5 illustrates the steps performed by the branch prediction circuit of the present invention when searching the Banked Branch Target Buffer Cache for upcoming branch instructions.

An Instruction Fetch Unit requests information about upcoming branch instructions by passing an instruction pointer to the branch prediction circuit 300. FIG. 5 illustrates the steps performed by the branch prediction circuit 300 when searching the Banked Branch Target Buffer Cache 310 for upcoming branch instructions. At step 101, the branch prediction circuit 300 receives the instruction pointer from the Instruction Fetch Unit 30.

At step 102, the branch prediction circuit 300 reads out a set of four branch entries from each of the four banks of the Banked Branch Target Buffer Cache 310 using the instruction pointer. At step 103, the instruction pointer is compared to tag address of each of the four branch entries from the selected BTB line in each bank to determine if any of the four branch entries contain information about a branch instruction in the 16 byte block pointed to by the instruction pointer. Within each branch target buffer bank, there can only be up to one branch entry match. Thus, at this point there can be up to four branch entry matches, one from each bank. The up to four branch entries are passed to the prioritizer selection logic 320.

At step 104, the prioritizer selection logic 320 eliminates the branch entries in the selected set that identify branch instructions located before the current instruction pointer. Since the branch entries are already in order, For example, referring to again to the memory map of FIG. 2, a four byte long branch instruction is illustrated at the hexadecimal addresses 1E to 21. The branch instruction at hexadecimal addresses 1E to 21 is placed into a branch entry in the Banked Branch Target Buffer Cache 310 and associated with the hexadecimal address 21 since that is the address of the last byte of the branch instruction. Since hexadecimal address 21 is one of the first four bytes in a memory block, this entry will be placed into the first Bank (Bank 0) with the block offset field 402 set to 1. If the current instruction pointer points to the hexadecimal address 23, then the prioritizer selection logic 320 eliminates Bank 0 entries that have values less than 3 in the block offset field 402 such that the branch entry for the branch instruction at hexadecimal address 21 is no longer considered.

The remaining branch entries describe branch instructions within the 16 byte block pointed to by the current instruction pointer and are located after the current instruction pointer. At step 105, The prioritizer selection logic 320 selects the first "taken" branch instruction from the remaining ordered branch entries. If there is no such taken branch instruction entry, then no branch prediction is made such that the instruction fetch unit fetches the next sequential memory block.

The foregoing has described a method and apparatus for implementing a Banked Branch Target Buffer Circuit that predicts branch instructions within an instruction stream. It is contemplated that changes and modifications may be made by one of ordinary skill in the art, to the materials and arrangements of elements of the present invention without departing from the scope of the invention.

We claim:

1. In a computer processor coupled to a memory, said memory divided into memory blocks, a branch prediction mechanism, said branch prediction mechanism predicting a block of memory to fetch based upon an instruction pointer that points to a currently executing instruction, said branch instruction prediction mechanism comprising:

a branch target buffer cache comprising plurality of ordered branch target buffer banks, each said ordered branch target buffer bank comprising a plurality of branch entries storing information about branch instructions addressed by address bits specifying a different subblock within said memory blocks;

a branch prediction circuit, said branch prediction circuit receiving said instruction pointer, said branch prediction circuit indexing into all of said ordered branch target buffer banks of said branch target buffer cache with said instruction pointer, said branch prediction circuit fetching at most one branch entry from each said plurality of branch target buffer banks; and a prioritizer circuit, said prioritizer circuit indicating the selection of one of said branch entries fetched by said branch prediction circuit from said ordered branch target buffer banks by selecting a first taken branch instruction located after said instruction pointer.

2. The branch instruction prediction mechanism as claimed in claim 1 wherein said memory blocks comprise 16 bytes.

3. The branch instruction prediction mechanism as claimed in claim 1 wherein each of said ordered branch target buffer banks in said branch target buffer cache are organized into a plurality of lines organized by an branch instruction address, each of said lines comprising at least one branch entry.

4. The branch instruction prediction mechanism as claimed in claim 3 wherein each line further comprises a branch pattern table.

5. The branch instruction prediction mechanism as claimed in claim 1 wherein each said associated branch instruction is stored into an entry of an ordered branch target buffer bank of said branch target buffer cache using an address of a last byte of said associated branch instruction.

6. The branch instruction prediction mechanism as claimed in claim 1 wherein each said branch entry in said ordered branch target buffer banks comprises:

a tag field;

a branch target address; and a valid bit.

7. The branch instruction prediction mechanism as claimed in claim 6 wherein each said branch entry in said ordered branch target buffer banks further comprises a branch type field.

8. The branch instruction prediction mechanism as claimed in claim 7 wherein each said branch entry in said ordered branch target buffer banks further comprises a block offset field that identifies an offset of a last byte of said associated branch instruction.

9. The branch instruction prediction mechanism as claimed in claim 8 wherein each said branch entry in said ordered branch target buffer banks further comprises a branch history field.

10. The branch instruction prediction mechanism as claimed in claim 9 wherein each said branch entry in said branch target buffer cache further comprises a speculation bit and a speculative branch history field.

11. In a computer system, a method of predicting a block of memory to fetch based upon an instruction pointer that points to a currently executing instruction, said method comprising the steps of:

receiving a current instruction pointer in a branch prediction mechanism, said branch prediction mechanism comprising a plurality of ordered branch target buffer banks;

indexing into all of said plurality of ordered branch target buffer banks, each said branch target buffer bank comprising a plurality of branch entries storing information about branch instructions addressed by address bits specifying a different subblock within said memory blocks;

retrieving at most one ordered branch entry from each said ordered branch target buffer banks; and selecting a next upcoming branch instruction from said retrieved ordered branch entries.

12. The method of updating a branch target buffer as claimed in claim 11 wherein each branch entry comprises a tag address identifying a partial address of a branch instruction associated with said branch entry and said step of selecting further comprises the substeps of:

comparing said instruction pointer with said tag address in each of said retrieved ordered branch entries from each branch target buffer bank and eliminating branch entries with non matching tag addresses.

13. The method of updating a branch target buffer as claimed in claim 12 wherein said step of selecting further comprises the substeps of:

comparing said instruction pointer with a block offset in each of said retrieved ordered branch entries, said block offset identifying least significant bits of a branch instruction associated with said branch entry; and eliminating retrieved ordered branch entries having block offsets that indicate that said branch entry is associated with a branch instruction identified with an address before said instruction pointer.

14. The method of updating a branch target buffer as claimed in claim 11 wherein said step of selecting further comprises the substeps of:

selecting a first taken branch instruction from said branch entries that have not been eliminated.

\* \* \* \* \*